T. E. MURRAY.
VEHICLE WHEEL.
APPLICATION FILED OCT. 2, 1914.
1,142,836.
Patented June 15, 1915.
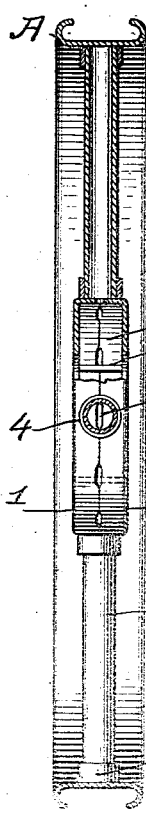
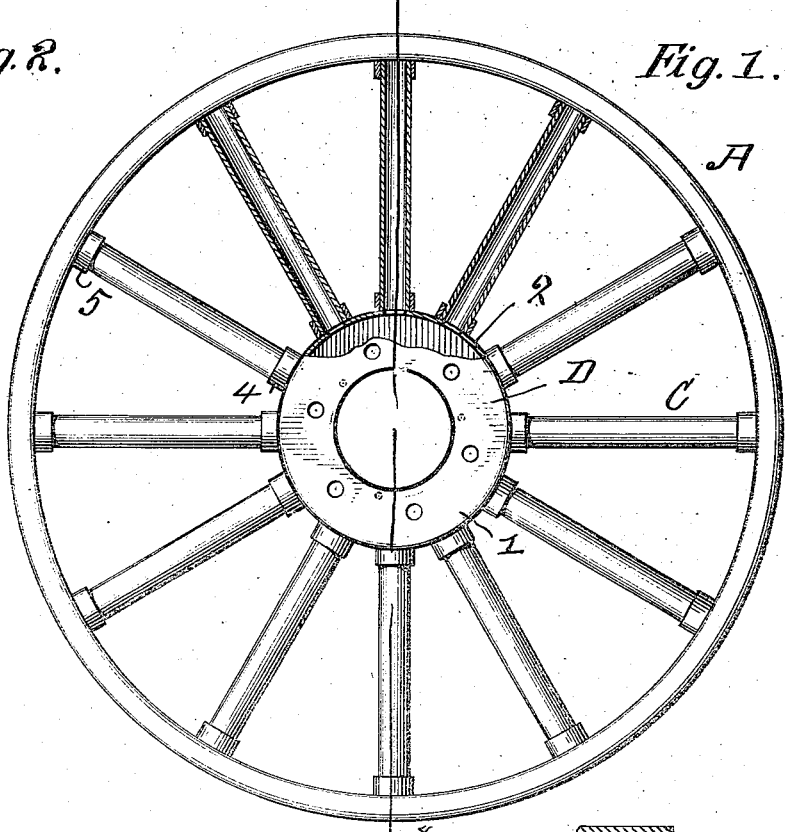
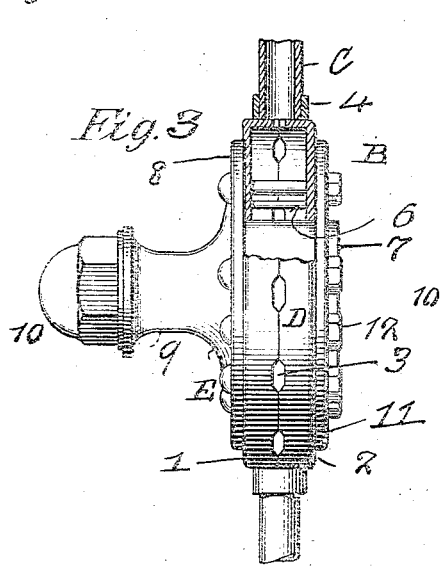
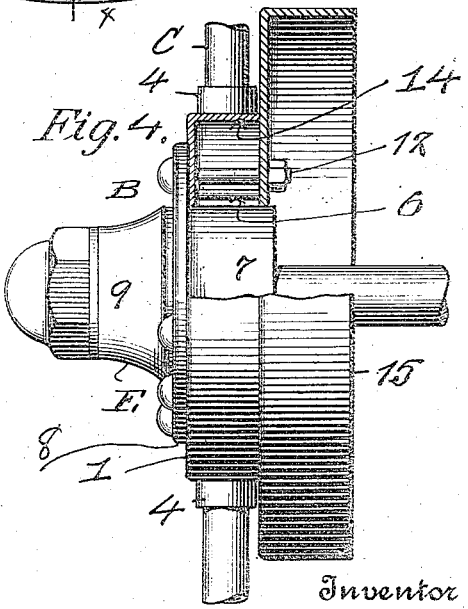
Inventor
Thomas E. Murray

UNITED STATES PATENT OFFICE.

THOMAS E. MURRAY, OF NEW YORK, N. Y.

VEHICLE-WHEEL.

1,142,836.

Specification of Letters Patent. Patented June 15, 1915.

Application filed October 2, 1914. Serial No. 864,559.

*To all whom it may concern:*

Be it known that I, THOMAS E. MURRAY, a citizen of the United States, residing at New York, in the county of New York and State of New York, have invented a certain new and useful Improvement in Vehicle-Wheels, of which the following is a specification.

The invention is a vehicle wheel formed of sheet or thin metal, and has for its object to simplify and cheapen the construction. Said wheel comprises a hub formed with an annular member having tubular sockets on its circumferential periphery, a tubular axle-receiving member detachably secured in the central opening of said annular member, a rim having tubular sockets on its inner periphery and spokes seated at their ends in said hub and rim sockets. The rim, hub and spokes are preferably homogeneously united, as by spot welding, to form a structural unit, from which the tubular axle-receiving member may be easily separated for any desired purpose.

In the accompanying drawings, Figure 1 is an elevation of my wheel, with the axle-receiving hub member removed, certain of the spokes and a portion of the annular spoke-supporting hub member being in section. Fig. 2 is a section on the line $x$, $x$ of Fig. 1. Fig. 3 is an enlarged side elevation of the complete hub, a portion being in section. Fig. 4 is a similar view of a modified construction of the hub.

Similar numbers and letters of reference indicate like parts.

The wheel comprises a rim A, a hub generally indicated at B, and tubular spokes C united to rim and hub.

The hub comprises an annular spoke-supporting member generally indicated at D, and a tubular axle-receiving member generally indicated at E.

The spoke-supporting member D consists of two annular disks 1 and 2, having their circumferential edges inwardly turned and homogeneously united, as by electric welding, to form a circumferential wall for said member. In order to reduce the area of the welded edges, I form in said walls openings 3 corresponding in number to the spokes C. On said wall and each inclosing one of said openings are welded tubular sockets 4, in which sockets the inner ends of the spokes C are seated. The outer ends of said spokes are seated in similar sockets 5 welded to the inner periphery of the rim A. In order to support the disks 1 and 2, I provide spacing rods 6, welded at their extremities to the inner faces of said disks. The rim A, spokes C and spoke-supporting member D thus form a structural unit, as shown in Fig. 1, from which the axle-receiving member E may be separated at will.

As shown in Fig. 3, said axle-supporting member E comprises the cylindrical portion 7 having an integral flange 8 and preferably a projection 9 closed at its outer end by any suitable cap or cover, indicated at 10. The cylindrical portion 7 is inserted in and extends through the central opening in disks 1 and 2 and on its protruding end receives a ring 11, through which and through the flange 8 and disks 1, 2 extend the headed bolts 12, which thus bind together the annular spoke-supporting member D and the axle-receiving member E.

In the modified form of my device shown in Fig. 4, the spoke-supporting member is formed of an annular disk 1 having its circumferential edge bent over to form a circular flange 14. To this flange, the shaft sockets 4 are welded. The cylindrical hub portion 7 after passing through the central opening in disk 1 enters the central opening in the annular brake pulley 15. The spacing rods 6 are welded at their ends to disk 1 and brake pulley 15, and the edge of flange 14 is also welded to said brake pulley. The axle-receiving member is detachably secured to the annular spoke-supporting member by means of the headed bolts 12 which pass through the brake pulley 15, disk 1 and flange 8.

I claim:

1. A vehicle wheel, comprising a hub formed of a hollow annular member made in two parts homogeneously united circumferentially and having openings intersected by the circumferential joint, tubular spoke-receiving sockets on the circumferential periphery of said member respectively covering said openings, a tubular axle-receiving member entering the central opening in said annular member, and means for securing together said annular member and said axle-receiving member.

2. A vehicle wheel, comprising a hub formed of a hollow annular member made in two parts homogeneously united circumferentially, tubular spoke-receiving sockets on the circumferential periphery of said member, spacing rods within said hollow annular member and secured at their ends to the parts thereof, a tubular axle-receiving member entering the central opening in said annular member, and means for securing together said annular member and said axle-receiving member.

In testimony whereof I have affixed my signature in presence of two witnesses.

THOMAS E. MURRAY.

Witnesses:
GERTRUDE P. PORTER,
MAY T. MCGARRY.